United States Patent [19]

Braun et al.

[11] Patent Number: 5,035,240

[45] Date of Patent: Jul. 30, 1991

[54] ELASTOMERIC FILTRATION MATERIALS

[75] Inventors: David L. Braun, Lake Elmo; Peter O. Rekow, Lauderdale; Daniel E. Meyer, Stillwater, all of Minn.

[73] Assignee: Minnesota Mining and Manufacturing Company, St Paul, Minn.

[21] Appl. No.: 541,081

[22] Filed: Jun. 19, 1990

Related U.S. Application Data

[63] Continuation of Ser. No. 423,708, Oct. 17, 1989, abandoned, which is a continuation of Ser. No. 193,809, May 13, 1988, abandoned.

[51] Int. Cl.$^5$ .............................................. A62B 7/10
[52] U.S. Cl. ........................... 128/205.27; 128/205.29
[58] Field of Search ..................... 128/205.29, 206.19, 128/205.27, 206.12; 55/DIG. 33, DIG. 35

[56] References Cited

U.S. PATENT DOCUMENTS

| | | |
|---|---|---|
| Re. 32,171 | 6/1986 | van Turnhout ..................... 55/155 |
| 3,971,373 | 7/1976 | Braun ................................ 128/146.2 |
| 4,100,324 | 7/1978 | Anderson et al. .................. 428/288 |
| 4,118,531 | 10/1978 | Hauser ................................ 428/224 |
| 4,209,563 | 6/1980 | Sisson ................................ 428/288 |
| 4,215,682 | 8/1980 | Kubik et al. ..................... 128/205.29 |
| 4,294,599 | 10/1981 | Grovesteen et al. ................. 55/485 |
| 4,334,901 | 6/1982 | Ayes et al. ............................ 55/487 |
| 4,379,192 | 4/1983 | Wahlquist et al. .................. 428/156 |
| 4,429,001 | 1/1984 | Kolpin et al. ....................... 428/283 |
| 4,588,537 | 5/1986 | Klaase et al. ......................... 264/22 |
| 4,600,002 | 7/1986 | Maryyanek et al. ........... 128/206.19 |
| 4,660,228 | 4/1987 | Ogawa et al. ........................... 2/167 |
| 4,662,005 | 5/1987 | Grier-Idris ............................... 2/9 |
| 4,692,368 | 9/1987 | Taylor et al. ....................... 428/137 |
| 4,692,371 | 9/1987 | Morman et al. .................... 428/224 |
| 4,707,398 | 11/1987 | Boggs ................................. 428/224 |

FOREIGN PATENT DOCUMENTS 2151272A 7/1985 United Kingdom .

OTHER PUBLICATIONS

Wente, Van A.-Superfine Thermoplastic Fibers, *Ind. Eng. Chem.*, vol. 48, p. 1342 et seq. (1956).
Development of Spunbonded Based on Thermoplastic Polyurethane, *Nonwoven World*, May-Jun., 1986, pp. 79-81.
Report 4364 Naval Res. Labs, 5/25/54 Manufacture of Superfine Organic Fibers by Wente, Van A., Boone, C. D. & Fhuharty, E. L.

*Primary Examiner*—Aaron J. Lewis
*Attorney, Agent, or Firm*—Gary L. Griswold; Walter N. Kirn; Carole Truesdale

[57] ABSTRACT

Elastomeric nonwoven fibrous fluid filter media for removal of particulate contaminants from the fluid are provided. The filter media comprises thermoplastic elastomeric melt-blown small diameter fibers, the small diameter fibers being randomly arrayed, the filter media having substantially uniform stretch properties in all directions and whose filtration properties are independent of filter media elongations sufficient to increase the filter media surface area at least about 10 percent. The filter media is particularly useful as a prefilter on respirators.

28 Claims, 2 Drawing Sheets

ELASTOMERIC FILTRATION MATERIALS

This is a continuation of application Ser. No. 07/423,708 filed Oct. 17, 1989, which is a continuation of Ser. No. 193,809 filed 5/13/88 both now abandoned.

BACKGROUND OF THE INVENTION

1. Field of the Invention

The present invention relates to nonwoven fibrous filter media which are particularly useful as prefilters on respirators.

2. Background Information

There is increasing interest by governmental agencies, the general public, and the work force in protecting individuals against the harmful effects of toxic materials such as lead fumes, silica dust, asbestos, and paint spray. A variety of face masks, respirators, and filters have been proposed to filter such toxic materials from the air.

U.S. Pat. No. 3,971,373 (Braun) discloses a particle-loaded small diameter fiber sheet product and respirators made therefrom. The sheet product comprises a uniform three-dimensional arrangement of discrete solid particles uniformly dispersed in a web of melt-blow small diameter fibers. The particles are physically held in the web, even though there is only point contact between the small diameter fibers and the particles, whereby the full surface of the particles is available for interaction with a medium to which the sheet product is exposed.

U.S. Pat. No. 4,215,682 (Kubik et al.) discloses a fibrous web electret which comprises melt-blown fibers prepared by extruding molten fiber-forming material through orifices into a high-velocity gaseous stream where the extruded material is drawn out into fiber and solidified in the fibrous form, the fibers having electrically charged particles and a persistent electric charge that is useful to enhance filtering properties of the web, the charge having a half-life of at least one week in a room-temperature, 100-percent-relative-humidity environment.

U.S. Pat. No. 4,294,599 (Grovesteen et al.) discloses an aerosol filter cartridge employing a prefilter having the form of a closely spiraled Fiberglas mat functioning to distribute captured aerosol particles substantially uniformly therethrough. The Fiberglas mat is placed edgewise against the final filtering components of the cartridge.

U.S. Pat. No. 4,334,901 (Ayes et al.) discloses a respirator cartridge which is designed to eliminate the traditional screen between the perforated cartridge bottom and its adjacent filter component, substitute Fiberglas for one of the usual two wool-felt components and minimize filter component-to-shell cementing operations along with reshaping of the initial aerosol contacting filter component for effecting greater than usual distribution of aerosol loading and lower inhalation resistance.

U.S. Pat. No. 4,600,002 (Maryyanek et al.) discloses a multiple ply, fold-flat, disposable respirator having, as one ply, a layer of a toxic gas or vapor absorbing material, and as another ply, an aerosol filter. The respirator has an inturned vertical seam covered with a strip of foamed elastomer.

U.S. Pat. No. 4,662,005 (Grier-Idris) discloses a pouch-like conformable face mask which includes a generally rectangular body portion formed from a filtration medium and having top and bottom edge portions and a pair of opposed side portions. An elastically extendible material is located at the periphery of the side and bottom edge portions of the generally rectangular body portion, mask to gather into a pouch or cup-like configuration.

U.S. Pat. No. Re. 32,171 discloses an electret fibrous web which is prepared by continuously feeding a film of highly molecular non-polar material; heating the film; stretching the film along the longitudinal axis thereof as defined by the path of movement of the film; homopolarly electrically charging at least one side of the film; fibrillating the charged film into fiber material; and collecting the fiber material.

Ogawa, in an article entitled "Development of Spunbonded Based on Thermoplastic Polyurethane," *Nonwovens World*, May-June, 1986. pp 79–81, describes a spunbonded nonwoven polyurethane elastic fabric developed by Kanebo Ltd. The fabric is made using a melt blown process which is different from a conventional melt blown process to produce fabric which is similar to that of spunbonded fabrics. The diameter of its filaments is not so fine as that of the usual melt blown fabrics, i.e., 0.5–2 microns, but apparently is closer to that of the spunbonded fabrics, i.e., 20–50 microns. The elasticity, dust catching capability, low linting, high friction coefficient, air permeability and welding characteristics of the urethane fabrics are discussed in the article.

SUMMARY OF THE INVENTION

The present invention provides elastomeric nonwoven fibrous fluid filter media for removal of particulate contaminants from the fluid comprising thermoplastic elastomeric melt-blown small diameter fibers, the small diameter fibers being randomly arrayed, the filter media having substantially uniform stretch properties in all directions, whose filtration properties are independent of filter media elongations sufficient to increase the filter media surface area at least about 10 percent, preferably at least about 25 percent, more preferably at least about 40 percent. The elastomeric filter media of the present invention have utility as low pressure drop filter and prefilter materials or as tubular fluid filters. The filter media may further comprise a variety of mixtures of fibers and/or particulate material such as, for example, absorbent particulate, staple fibers, or electrically charged fibrils.

The present invention further provides a respirator having as a low pressure drop prefilter thereon for removal of particulate fluid contaminants elastomeric nonwoven fibrous fluid filter media comprising thermoplastic elastomeric melt-blown small diameter fibers, the small diameter fibers being randomly arrayed, the filter media having substantially uniform stretch properties in all directions, whose filtration properties are independent of filter media elongations sufficient to increase the filter media surface area at least about 10 percent.

Surprisingly, the filtration performance of the filter media of the present invention remains substantially constant when the media is subjected to mechanical stresses which increased their area. This is particularly surprising in that the filter media becomes thinner when stretched and the geometry of the open area of the media is significantly altered as the filter media is stretched. The comparatively constant filtration performance might be expected with minor extensions which produce increases of 3 or 4 percent in the total area of the filter, but such comparatively constant filtration performance is totally unexpected with extensions that produced increases in excess of 40 percent in the area of the filter.

Filtration performance which is substantially independent of the degree of elongation of the filter media coupled with a low pressure drop on loading enables the elastomeric filter media of the present invention to function very effectively as prefilter materials. In addition to their highly desirable filtration properties, the inherent elasticity and conformability of the filter media and the ability to seal against a range of complex filter holders without elaborate adapters makes the elastomeric filter media of the present invention a very versatile and economic prefilter material.

The filter media of the present invention are elastic, and hence are not subject to catastrophic failure on experiencing comparatively small mechanical stresses, i.e., 5 percent or less increase in area, as are nonwoven filter media prepared from polypropylene and polycarbonate materials. Also, because of their elastic properties and associated toughness as compared to the inelastic polypropylene and polycarbonate media, they require little, if any, additional support or protection, such as, for example, as occur in laminated structures. The elastic properties of the filter media also enable the filter media to seal against a filtration fixture simply by stretching the filter media over a smooth edge of the filtration fixture.

DETAILED DESCRIPTION OF THE INVENTION

Figure 1:
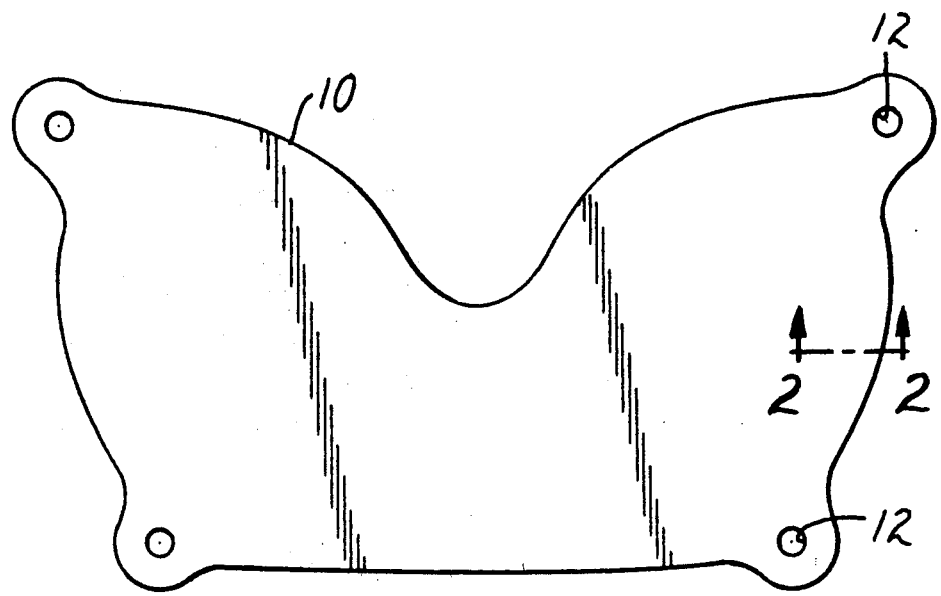
FIG. 1 is a single-piece prefilter element based on the elastomeric filter media of the present invention.

The nonwoven elastomeric filter media of the present invention are based on melt blown webs of thermoplastic elastomeric small diameter fibers. Elastomeric thermoplastic materials from which the small diameter fiber webs can be prepared include, for example, elastomeric polyurethanes, elastomeric polyesters, elastomeric polyamides and elastomeric A-B-A' block copolymers wherein A and A' are styrenic moieties and B is an elastomeric midblock.

Filtration properties of the elastomeric filter media of the present invention can be tailored over a wide range through selection of the appropriate melt blown fiber size or by uniform incorporation of crimped spacing staple fibers, or electrically charged or chargeable fibers or fibrous clusters into the web matrix. Sorbent particulate material may also be incorporated in the web.

Crimped spacing staple fibers are preferably included in the filter media to reduce the pressure drop during use and to decrease caking of the filter media by the material being filtered as well as to provide filtration. Useful crimped spacing fibers include, for example, acrylic, polyester, nylon and polyolefin fibers. Polyester and acrylic fibers are particularly preferred. The crimped spacing fibers are preferably incorporated at loading levels of from about 10 to 60 weight percent, more preferably about 25 to 35 weight percent of the filter media. The crimped spacing fibers preferably are about 1.5 to 15, more preferably 4 to 6, denier in size and have an average staple length sufficient to include at least one complete crimp, more preferably at least three or four crimps. Generally the crimped spacing fibers should average about 2 to 15 centimeters in length. Preferably the crimped spacing fibers are less than about 5 centimeters in length.

The ability of the elastomeric filter media to remove small particulate matter from an air stream can be dramatically improved by incorporating into the filter media charged fibers, i.e., fibrillated polypropylene fibers such as those described in U.S. Pat. No. 4,588,537 (Klasse et al.), which is incorporated herein by reference for that purpose. Such charged fibers also can serve as spacing fibers to reduce pressure drops during particulate filtration. Preferably the amount of charged fibers incorporated in the filter media is in the range of about 10 to 60 weight percent, more preferably in the range of about 25 to 35 weight percent.

Elastic properties of the filter media are controlled by the size of the fiber making up the filter media, the amounts of various types of fibers in the filter media and the basis weight of the web. The elastomeric small diameter fibers preferably have diameters of from about 1 micron to greater than 50 microns, more preferably from about 5 microns to about 30 microns. When the diameter of the small diameter fibers is less than 1 micron, the web may lack sufficient tensile strength. When the diameter of the small diameter fibers is greater than about 50 microns, filtration properties may be reduced.

The basis weight of the web is also a major factor in controlling the elastic properties of the filter media. Higher basis weight webs are typically used for applications requiring higher tensions or higher filtration properties while lower basis weight webs are utilized for applications requiring low tensions. Web basis weights are preferably in the range of from about 15 to about 300 grams/m$^2$, more preferably in the range of from about 100 to about 200 gm/m$^2$. As was the case with the fiber diameter, the specific application will determine the optimum web basis weight.

The filter media of the invention preferably has a tensile strength of at least about 0.5 g/2.5 cm width/g/m$^2$ basis weight, more preferably at least about 2 g/2.5 cm width/g/m$^2$ basis weight. When the tensile strength is less than 0.1 g/2.5 cm width/g/m$^2$ basis weight, the filter media may tear during attachment to a fixture or respirator.

The filter media of the invention preferably has an elongation at break of at least about 50%, more preferably at least about 100%. When the elongation at break is less than 20%, the filter media may rupture during use, e.g., when being stretched over a respirator as a prefilter.

The filter media of the present invention can be prepared by a process similar to that taught in Wente, Van A., "Superfine Thermoplastic Fibers" in Industrial Engineering Chemistry, Vol. 48, pages 1342 et seq (1956), or in Report No. 4364 of the Naval Research Laboratories, published May 25, 1954 entitled "Manufacture of Superfine Organic Fibers" by Wente, Van A., Boone, C. D. and Fluharty, E. L. except that a circular orifice die is preferably used. The thermoplastic elastomeric materials are extruded through the die into a high velocity stream of heated air which draws out and attenuates the fibers prior to their solidification and collection.

Loading of the elastomeric melt blown webs with crimped spacing staple fibers or fibrous clusters can be achieved by gently introducing a secondary air stream containing the staple fibers or fibrous clusters into the primary air stream carrying the extruded fibers in a manner similar to that described in U.S. Pat. No. 4,118,531 (Hauser), which is herein incorporated by reference, at a point where the fibers are still in a tacky condition. The secondary air stream, which typically has a velocity of from about 10 to about 50 m/sec, intersects the primary air stream, which typically has a velocity of from about 100 to about 180 m/sec, in a substantially perpendicular manner.

The thus-loaded fiber stream can then be collected in a random fashion such as, for example, on a perforated screen cylinder, prior to complete fiber solidification so that the fibers can form a coherent web which does not require additional binders. It is suspected that some adhesive bonding beteen fibers at points of contact may occur between fibers when they contact each other prior to complete solidification.

Figure 2:
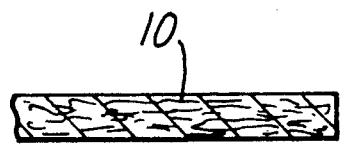
FIG. 2 is a cross-sectional view of the prefilter element of FIG. 1 taken along line 1—1 of FIG. 1.

The filter media of the invention is particularly useful as a prefilter for respirators. FIG. 1 is an illustration of a single piece prefilter element 10 utilizing the elastomeric filter media of the present invention. The element 10, which is slightly undersized for the filter area it is intended to protect as a prefilter, can be shaped to accommodate exhalation valves or other critical elements of a respirator. The element is retained over the filter area of the respirator in a stretched condition by means of the attachment eyelets 12 which fit over mounting posts on the respirator body. The eyelets typically are reinforced by densifying the filter media in the area immediately around the eyelet by means of heat and pressure. A cross-sectional view of the prefilter element is shown in FIG. 2.

Figure 3:
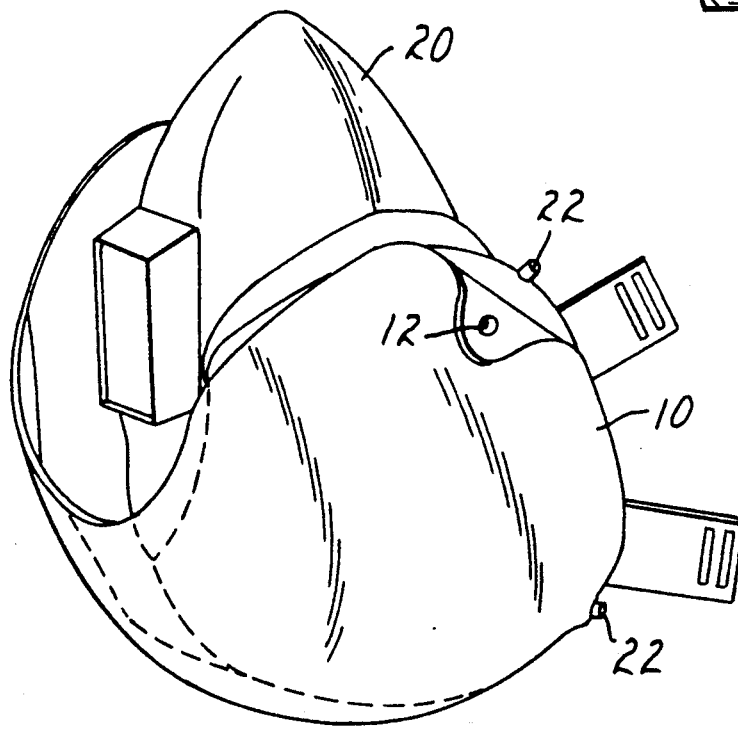
FIG. 3 is the prefilter illustrated in FIG. 1 installed on a respirator.

FIG. 3 illustrates installation of the prefilter element shown in FIG. 1 on a respirator which involves a number of complex design elements. The respirator 20 has a substantially spherical shape which would typically require a complex adapter arrangement to seal a non-elastic prefilter element against the respirator. The prefilter element 10 based on the elastomeric filter media of the present invention is readily sealed against this complex structure by means of a four point attachment to the respirator. The attachment eyelets 12 are simply slipped over the attachment posts 22 which cause the prefilter element to be stretched and tightly conform to the contours of the respirator, thereby effecting a seal between the prefilter element and the respirator. (An effective seal is realized when gaps between the filter media and the filtration fixture are reduced to a dimension less than that occurring in the pores of the filter media.) Once loaded, the prefilter element is removed and replaced with a new element, a procedure which is far less expensive than replacing an entire respirator or respirator cartridge.

Figure 4:
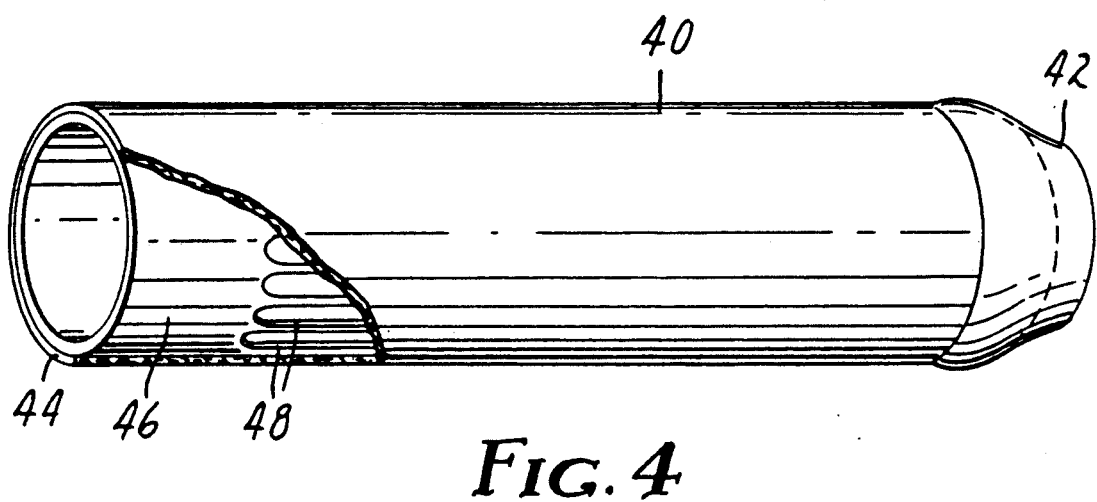
FIG. 4 tubular elastic filter mounted on a filter tube.

A further useful application for the filter media of the invention is as a tubular elastic filter for a filter tube as shown in FIG. 4. Tubular elastic filter 40 which has a sealed end 42 and an open end 44 is slightly smaller in diameter than filter tube 46 which has openings or perforations 48. The tubular elastic filter is merely stretched over the filter tube and is form-fitted due to its smaller diameter.

This invention is further illustrated by the following examples, but the particular materials and amounts thereof recited in these examples, as well as other conditions and details, should not be construed to unduly limit this invention.

In the examples all parts and percentages are by weight unless otherwise specified. In the examples tests were conducted by placing the filter media over the test holder, stretched to the indicated degree of extension and secured against the cylinder of the test holder in that configuration with two elastic rubber bands (No. 62), available from Universal Corp., Forest Park, IL. The following test methods were used for evaluation purposes in the examples:

Dioctyl Phthalate (DOP) Aerosol Penetration (30 C.F.R. Part 11, Subpart K, NIOSH Regulations):

A sample of filter media is mounted on an aluminum cylinder (9.28 cm diameter, 5 cm high) hermetically mounted directly over a 9.28 cm hole in an aluminum sheet. The sample was tested using an Air Techniques, Inc. Model Q127 DOP Penetrometer TM set at a flow rate of 32 liters/minute and generating an aerosol of 0.3 micron DOP particles at a mass concentration of 100 mg/m$^3$. The initial filter weight, area stretch, DOP penetration, pressure drop are reported.

Lead Fume Removal (30 C.F.R. Part 11, Subpart M, NIOSH Regulations):

A sample of filter media is mounted on an aluminum cylinder (9.28 cm diameter, 5 cm high) hermetically mounted on a 0.64 cm thick fiber glass/resin board which had a 29/42 standard taper epoxy fitting centrally positioned below the cylinder and hermetically sealed to the Fiberglas/resin board. The sample was exposed to a lead fume challenge of between 15–20 mg/m$^3$ (calculated on the basis of metallic lead content) at a flow rate of 16 liters per minute for a period of 90 minutes. The initial filter weight, area stretch, filter weight gain due to lead removal, lead penetration, initial pressure drop, and final pressure drop are reported.

Silica Dust Removal (30 C.F.R. Part 11, Subpart K, NIOSH Regulations):

A sample of filter media is mounted on an aluminum cylinder (9.28 cm diameter, 5 cm high) hermetically mounted on a 0.64 cm thick fiber glass/resin board which had a 29/42 standard taper epoxy fitting centrally positioned below the cylinder and hermetically sealed to the Fiberglas/resin board. The sample was exposed to a silica dust challenge of between 50–60 mg/m$^3$ at a flow rate of 16 liters/minute for a period of 90 minutes. The initial filter weight, area stretch, filter weight gain due to silica dust removal, silica dust penetration, initial pressure drop, and final pressure drop are reported.

Spray Paint Removal (30 C.F.R. Part 11, Subpart L, NIOSH Regulations):

Enamel paint:

A sample of filter media is mounted on an aluminum cylinder (9.28 cm diameter, 5 cm high) hermetically mounted on a 0.64 cm thick fiber glass/resin board which had a 29/42 standard taper epoxy fitting centrally positioned below the cylinder and hermetically sealed to the Fiberglas/resin board. The sample was exposed to an enamel paint challenge of 190–250 gm/m$^3$ at a flow of 16 liters/minute for 156 minutes. The area stretch, amount filtered, initial pressure drop, and final pressure drop are reported.

Lacquer-based paint:

A sample of filter media is mounted on an aluminum cylinder (9.28 cm diameter, 5 cm high) hermetically mounted on a 0.64 cm thick fiber glass/resin board which had a 29/42 standard taper epoxy fitting centrally positioned below the cylinder and hermetically sealed to the Fiberglas/resin board. The sample was exposed to a lacquer-based paint challenge of 95-125 mg/m$^3$ at a flow of 16 liters/minute for 156 minutes. The area stretch, amount filtered, initial pressure drop, and final pressure drop are reported.

EXAMPLES 1-15

Filter media having multi-directional elastic properties were prepared by melt blowing PS-455-200, a polyesterurethane thermoplastic elastomeric resin available from K. J. Quinn Co., Malden, MA, using a process similar to that described in Wente, Van A., "Superfine Thermoplastic Fibers" in Industrial Engineering Chemistry, Vol. 48, pages 1342 et seq (1965) or in Report No. 4364 of the Naval Research Laboratories, published May 25, 1964 entitled "Manufacture of Superfine Organic Fibers" by Wente, Van A., Boone, C. D., and Fluharty, E. L. except that the melt-blowing die had smooth surfaced circular orifices (10/cm) with a 5:1 length-to-diameter ratio. The die temperature was maintained at 220° C., the primary air temperature and pressure were, respectively, 230° C. and 150 kPa, (0.63 cm gap width), and the polymer throughput rate was about 150 gm/hr/cm.

Secondary fibers were loaded into the polyurethane web by dispersing polyester staple fibers (5.5 denier, 3.75 cm in length) in a secondary air stream and impinging that air stream into the primary air stream carrying the polyurethane fiber stream in a process similar to that described in U.S. Pat. No. 4,118,531 (Hauser), at a point where the fibers were still in a tacky condition. The secondary air stream intersected the primary air stream in a substantially perpendicular manner. The thus-loaded fiber stream was collected in a random manner on a perforated screen cylinder prior to complete fiber solidification so that the fibers were able to bond to one another and form a coherent web.

The basis weight of the polyurethane web was 100 gm/m$^2$ and the polyester staple fiber was added to the polyurethane web at a rate of 40 gm/m$^2$ to produce a filter media having a basis weight of about 140 gm/m$^2$.

Circular test samples (14.6 cm in diameter) were die cut from both the polyurethane based filter media and the control polypropylene media and marked with three concentric circles having diameters of 7.72, 8.44 and 9.28 cm respectively using a stencil as a guide. The outer circle coincided with the diameter of the test holder and the middle and inner circles corresponded to indicia for 10 and 20 percent diametrical (21 and 44 percent area) extension, respectively, as the filter media was stretched over the filter holder until the circle coincided with the edge of the holder. In stretching the filter media, the basis weight of the filter media decreased to 82.6 percent of the original value, or 115.6 gm/m$^2$ with the 10 percent extension and to 69.5 percent of the original value, or 97.3 gm/m$^2$ with the 20 percent extension.

The thickness of the filter media was also measured on an unstretched sample and on samples at 10% extension and 20% extension. The samples were mounted as described above except that a solid polished nylon surface was placed beneath the sample and a controlled surface pressure of 0.69 kPa (0.1 psi) was applied to the filter media surface. The thickness was measured using a Mitutoyo No. 192-116 depth gauge and a Starrett No. 711 dial indicator. The initial thickness was 0.23 cm; the thickness at 10% extension (21% area increase) was 0.19 cm; and the thickness at 20% extension (44% area increase) was 0.15 cm.

Samples were tested for DOP aerosol penetration (Examples 1-3), lead fume removal Examples 4-6), silica dust removal (Examples 7-9), and spray paint removal (Enamel—Examples 10-12; Lacquer—Examples 13-15). The results are reported in Tables I, II, III, and IV, respectively.

COMPARATIVE EXAMPLE 1

A commercially available elastomeric polyurethane web Kanebo TM type ES25, available from Kanebo Company, Japan, having a basis weight of 20 g/m$^2$ was tested for spray paint removal. Seven layers of web were used to achieve a basis weight comparable to the the filter media of Example 1. The results are reported in Table IV.

TABLE I

|  | Example 1 | Example 2 | Example 3 |
|---|---|---|---|
| Initial filter weight (g): | 2.71 | 2.40 | 2.57 |
| Area stretch (%): | 0 | 21 | 44 |
| DOP penetration (%): | 96 | 96 | 95 |
| Pressure drop (mm H$_2$O): | 0.6 | 0.4 | 0.45 |

The DOP test data presented in Table I suggests that, for the filter media constructions evaluated, the filtration performance is independent of elongation.

TABLE II

|  | Example 4 | Example 5 | Example 6 |
|---|---|---|---|
| Initial filter weight (g): | 2.7244 | 2.7589 | 2.5484 |
| Area stretch (%): | 0 | 21 | 44 |
| Filter weight gain[1] (mg): | 11.3 | 12.6 | 11.9 |
| Lead penetration[1] (mg): | 12.8 | 13.37 | 14.10 |
| Initial pressure drop[2] (mm H$_2$O): | 0.80 | 0.76 | 0.62 |
| Final pressure drop[2] (mm H$_2$O): | 1.70 | 1.78 | 1.46 |

[1]Determined at a flow rate of 16 lpm
[2]Determined at a flow rate of 42.5 lpm

The lead fume removal data presented in Table II shows similar filtration performance for all degrees of elongation of the filter media and also a low pressure drop increase during the test. This data suggests that the filter media constructions tested would have utility as prefilters to remove a portion of lead particulate from air without a significant increase in pressure drop.

TABLE III

|  | Example 7 | Example 8 | Example 9 |
|---|---|---|---|
| Initial filter weight (g): | 2.7144 | 2.6378 | 2.6059 |
| Area stretch (%): | 0 | 21 | 44 |
| Filter weight gain[1] (mg): | 50.4 | 50.15 | 51.10 |
| Silica penetration[1] (mg): | 51.82 | 53.68 | 56.12 |
| Initial pressure drop[2] (mm H$_2$O): | 1.55 | 1.45 | 1.20 |
| Final pressure drop[2] (mm H$_2$O): | 3.15 | 3.10 | 2.85 |

[1]Determined at a flow rate of 16 lpm
[2]Determined at a flow rate of 42.5 lpm

The silica dust removal data presented in Table III shows similar performance for all degrees of elongation of the filter media and a low pressure drop increase during the test. This data suggests, as did the lead fume removal data, that the filter media constructions tested would have utility as prefilters to remove a portion of a particulate from air without a significant increase in pressure drop.

TABLE IV

| Example | Area stretch (%) | Amount filtered (%) | Initial pressure drop (mm H2O) | Final pressure drop (mm H2O) |
|---------|------------------|---------------------|--------------------------------|------------------------------|
| Enamel Test |  |  |  |  |
| 10 | 0 | 46 | 0.6 | 0.7 |
| 11 | 21 | 49 | 0.9 | 1.0 |
| 12 | 44 | 51 | 0.8 | 1.0 |
| Comp. 1 | 0 | 29 | 0.3 | 0.5 |
| Lacquer Test |  |  |  |  |
| 13 | 0 | 74 | 0.7 | 38 |
| 14 | 21 | 79 | 0.7 | 74 |
| 15 | 44 | 82 | 0.6 | 125 |
| Comp. 2 | 0 | 48 | 0.3 | 9 |

The data in Table IV demonstrates that stretching the filter media of the invention has little effect on filtration efficiency and, in the case of the Enamel Test, very little change in pressure drop occurs with stretching the filter media. The comparative elastic web performs much less efficiently than the filter media of the invention.

COMPARATIVE EXAMPLE 3

An other comparative web based on polypropylene was prepared in a process similar to that described in Wente, Van A., "Superfine Thermoplastic Fibers" in Industrial Engineering Chemistry, Vol. 48, pages 1342 et seq (1965) or in Report No. 4364 of the Naval Research Laboratories, published May 25, 1964 entitled "Manufacture of Superfine Organic Fibers" by Wente, Van A., Boone, C. D., and Fluharty, E. L.. The polypropylene web had a basis weight of 55 g/m².

All attempts to stretch this web over the test sample holder resulted in a catastrophic failure, i.e., tearing, of the web so no comparative data between filter media of the invention and the control web could be made.

EXAMPLES 16-17

Filter media was prepared as in Examples 1-15 except the polyester fiber was replaced with 50 g/m² of a fibrillated, charged polypropylene film (Filtrete TM, available from Filtrete Company) to produce filter media with a basis weight of 150 g/m². The filter media was subjected to a lacquer paint spray test. The results are set forth in Table V.

TABLE V

| Example | Area stretch (%) | Amount filtered (%) | Initial pressure drop (mm H2O) | Final pressure drop (mm H2O) |
|---------|------------------|---------------------|--------------------------------|------------------------------|
| 16 | 0 | 99 | 1 | 17 |
| 17 | 21 | 98 | 1 | 58 |

The data in Table V demonstrates that very efficient lacquer paint spray removal can be achieved with filter media of the invention containing charged fibers and that performance remains substantially constant even when the filter media is stretched.

EXAMPLES 18 AND 19

In Examples 18 and 19, elastomeric filter media was prepared as in Examples 1-15 except, in Example 18, the amount of polyester staple fiber was increased to 45 g/m² to produce a filter media basis weight of 145 g/m² and, in Example 19, the polyester staple fiber was replaced with 50 g/m² of a fibrillated, charged polypropylene film (Filtrete TM, available from Filtrete Company) to produce filter media with a basis weight of 150 g/m². Each filter media was tested for lacquer paint spray removal using 30 C.F.R. 11, Subpart L. The test results are set forth in Table VI.

TABLE VI

| Example | Area stretch (%) | Amount filtered (%) | Initial pressure drop (mm H2O) | Final pressure drop (mm H2O) |
|---------|------------------|---------------------|--------------------------------|------------------------------|
| 18 | 0 | 64 | 12 | 57 |
| 19 | 0 | 98 | 12 | 58 |

The data in Table VI demonstrate that improved performance in lacquer paint spray removal can be achieved by substituting charged polypropylene fibers for uncharged polyester fibers.

The various modifications and alterations of this invention will be apparent to those skilled in the art without departing from the scope and spirit of this invention and this invention should not be restricted to that set forth herein for illustrative purposes.

What is claimed is:

1. Elastomeric nonwoven fibrous fluid filter media for removal of particulate contaminants from the fluid comprising thermoplastic elastomeric melt-blown small diameter fibers selected from elastomeric polyurethane fibers, elastomeric polyester fibers, elastomeric polyamide fibers and elastomeric A-B-A' block copolymers wherein A and A' are styrenic moieties and B is an elastomeric midblock, the small diameter fibers being randomly arrayed, the filter media having substantially uniform stretch properties in all directions and whose filtration properties are independent of filter media elongations sufficient to increase the filter media surface area at least about 10 percent.

2. The filter media of claim 1 wherein the small diameter fibers have diameters of from about 1 micron to greater than 50 microns.

3. The filter media of claim 1 wherein the small diameter fibers have diameters of from about 5 microns to about 30 microns.

4. The filter media of claim 1 wherein the filter media basis weight is in the range of from about 15 to about 300 grams/m².

5. The filter media of claim 1 wherein the filter media has a basis weight in the range of from about 100 to about 200 gm/m².

6. The filter media of claim 1 wherein the filter media has a tensile strength of at least about 0.5 g/2.5 cm width/g/m² basis weight.

7. The filter media of claim 1 wherein the filter media has a tensile strength of at least about 2 g/2.5 cm width/g/m² basis weight.

8. The filter media of claim 1 wherein the filter media has an elongation at break of at least about 50%.

9. The filter media of claim 1 wherein the filter media has an elongation of at least about 100%.

10. The filter media of claim 1 wherein the filter media further comprises crimped spacing staple fibers.

11. The filter media of claim 1 wherein the crimped spacing staple fibers comprise acrylic, polyester, nylon or polyolefin fibers.

12. The filter media of claim 1 wherein the crimped spacing staple fibers comprise polyester and acrylic fibers.

13. The filter media of claim 1 wherein the the crimped bulking fibers comprise from about 10 to 60 weight percent of the filter media.

14. The filter media of claim 1 wherein the crimped bulking fibers comprise about 25 to 35 weight percent of the filter media.

15. The filter media of claim 1 wherein the crimped bulking staple fibers are about 1.5 to 15 denier in size.

16. The filter media of claim 1 wherein the crimped bulking staple fibers are 4 to 6 denier in size.

17. The filter media of claim 1 wherein the crimped bulking staple fibers have an average staple length sufficient to include at least one complete crimp.

18. The filter media of claim 1 wherein the crimped bulking staple fibers have at least three or four crimps.

19. The filter media of claim 1 wherein the the crimped spacing fibers average about 2 to 15 centimeters in length.

20. The filter media of claim 1 wherein the the crimped spacing fibers are less than about 7 to 10 centimeters in length.

21. The filter media of claim 1 wherein the filter media further comprises charged fibers.

22. The filter media of claim 1 wherein the charged fibers comprise about 10 to 60 weight percent of the filter media.

23. The filter media of claim 1 wherein the charged fibers comprise about 25 to 35 weight percent of the filter media.

24. A respirator which is substantially spherical in shape and having a filter cartridge therein, said respirator having as a low pressure drop prefilter thereon for removal of particulate fluid contaminants elastomeric nonwoven fibrous fluid filter media comprising thermoplastic elastomeric melt-blown small diameter fibers selected from elastomeric polyurethane fibers, elastomeric polyester fibers, elastomeric polyamide fibers and elastomeric A-B-A' block copolymers wherein A and A' are styrenic moieties and B is an elastomeric midblock, the small diameter fibers being randomly arrayed and bonded at points of contact, the filter media having substantially uniform stretch properties in all directions, whose filtration properties are independent of filter media elongations to at least 110 percent of the original filter area.

25. A method for removing particulate contaminants from a fluid comprising the steps of providing a respirator having a substantially spherical shape with a prefilter and passing said particulate contaminated fluid through said prefilter and respirator, thereby removing said particulate contaminants from said fluid, said respirator having a low pressure drop prefilter thereon, said prefilter comprising thermoplastic elastomeric melt-blown small diameter fibers, said thermoplastic elastomeric melt-blown small diameter fibers comprise elastomeric polyurethanes, elastomeric polyesters, elastomeric polyamides and elastomeric A-B-A' block copolymers wherein A and A' are styrenic moieties and B is an elastomeric midblock, the small diameter fibers being randomly arrayed and bonded at points of contact, the prefilter having substantially uniform stretch properties in all directions and whose filtration properties are independent of prefilter elongations to at least 110 percent of the original prefilter.

26. The method of claim 25 wherein said prefilter has a tensile strength of at least about 0.5 g/2.5 cm width/g/m² basis weight.

27. The method of claim 25 wherein said prefilter further comprises crimped spacing staple fibers.

28. The method of claim 25 wherein said prefilter further comprises charged fibers.

* * * * *

UNITED STATES PATENT AND TRADEMARK OFFICE
CERTIFICATE OF CORRECTION

PATENT NO. : 5,035,240

DATED : July 30, 1991

INVENTOR(S) : David L. Braun, Peter O. Pekow and Daniel E. Meyer

It is certified that error appears in the above-identified patent and that said Letters Patent is hereby corrected as shown below:

Col. 5, line 19    "beteen" should read -- between --

Col. 6, line 61    "gm/m$^3$" should read -- mg/m$^3$ --.

Signed and Sealed this

Second Day of February, 1993

*Attest:*

STEPHEN G. KUNIN

*Attesting Officer*    *Acting Commissioner of Patents and Trademarks*